United States Patent [19]

Malcolm

[11] Patent Number: 4,553,774
[45] Date of Patent: Nov. 19, 1985

[54] VEHICLE SUSPENSION

[76] Inventor: George D. Malcolm, P.O. Box 334, Station T, Calgary, Alberta, Canada, T2H 2G9

[21] Appl. No.: 529,640

[22] Filed: Sep. 6, 1983

[30] Foreign Application Priority Data

Sep. 7, 1982 [NZ] New Zealand .................. 201835

[51] Int. Cl.[4] .................................................. B60G 11/04
[52] U.S. Cl. .................................. 280/718; 267/36 R; 267/52; 280/65; 280/79; 280/669; 280/789
[58] Field of Search ................... 280/718, 720, 65, 79, 280/67, 669, 103, 789; 267/36 R, 38, 40, 47, 52

[56] References Cited

U.S. PATENT DOCUMENTS

| 153,545 | 7/1874 | Davis | 280/65 |
| 2,101,545 | 12/1937 | Jacob | 280/718 |
| 2,691,534 | 10/1954 | Sampsall | 280/65 |
| 3,103,350 | 9/1963 | Chosy | 267/52 |
| 3,387,853 | 6/1968 | Sueoka | 280/789 |
| 3,730,508 | 5/1973 | Marian et al. | 267/52 |

Primary Examiner—Joseph F. Peters, Jr.
Assistant Examiner—Kenneth R. Rice
Attorney, Agent, or Firm—Stevens, Davis, Miller & Mosher

[57] ABSTRACT

A beam axle is passed through 2 separated plates, one pair at each end. A stub axle also passes through the 2 plates at each end and is offset from the beam axle. The innovation is the location of a leaf spring between the plate and between the stub and beam axles. The spring is preferably jammed in position by opposing wedges. The springs are closer to the wheels than is possible in prior art constructions.

8 Claims, 3 Drawing Figures

VEHICLE SUSPENSION

BACKGROUND OF THE INVENTION

This invention relates to a suspension, specifically designed for use on trailed vehicles, although it is possible to use it on other vehicles in some circumstances.

It has been common practice in the past to provide trailer suspensions in the form of a main or beam axle with a stub axle extending out from each end thereof along a line parallel to, but not collinear with, the main axle. The stub axles are typically mounted vertically above the main axle and secured to it by a pair of end plates or a box section through which both axles pass. Alternatively, the main axle may itself be curved upwardly and then outwardly near each end. Adjacent the box section on the upwardly shaped portion a leaf spring is secured to the suspension to enable a trailer body to be mounted upon the axle.

However, the construction at each side takes up a substantial amount of the width of the trailed vehicle, and it has not been possible to make full use of the space between the wheels.

The object of the present invention is to provide an arrangement whereby the leaf springs are as close to the wheels as possible.

BRIEF SUMMARY OF THE INVENTION

The present invention consists in a suspension comprising a beam axle, a pair of spaced plates at each end of the beam axle through which said beam axle passes, a stub axle at each end of the beam axle each stub axle passing through a pair of said plates, the stub axles being offset from the beam axle and a leaf spring at each end of the beam axle fixed between the plates and between the stub axle and the beam axle.

BRIEF DESCRIPTION OF THE DRAWINGS

A preferred form of the invention will be described by way of example with reference to the accompanying drawings in which.

DETAILED DESCRIPTION OF THE PREFERRED EMBODIMENT

Figure 1:
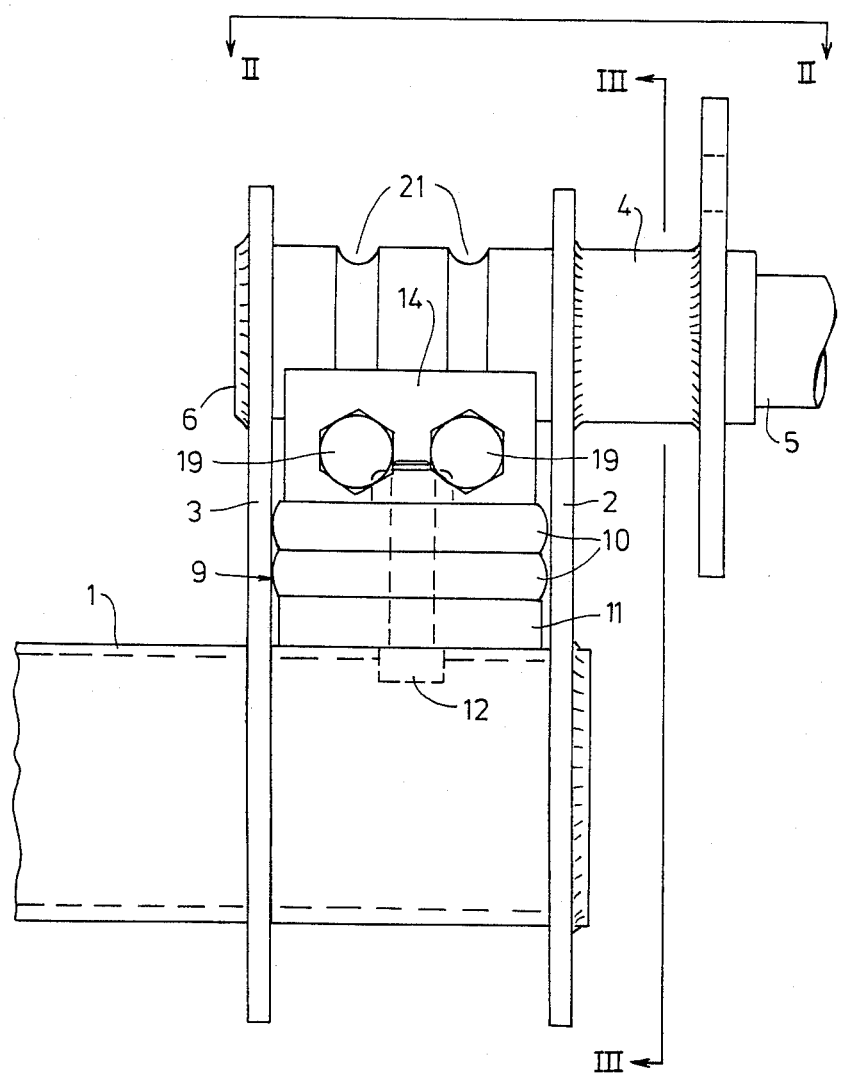
FIG. 1 is an elevation of part of a trailer suspension, incorporating the present invention.
Figure 2:
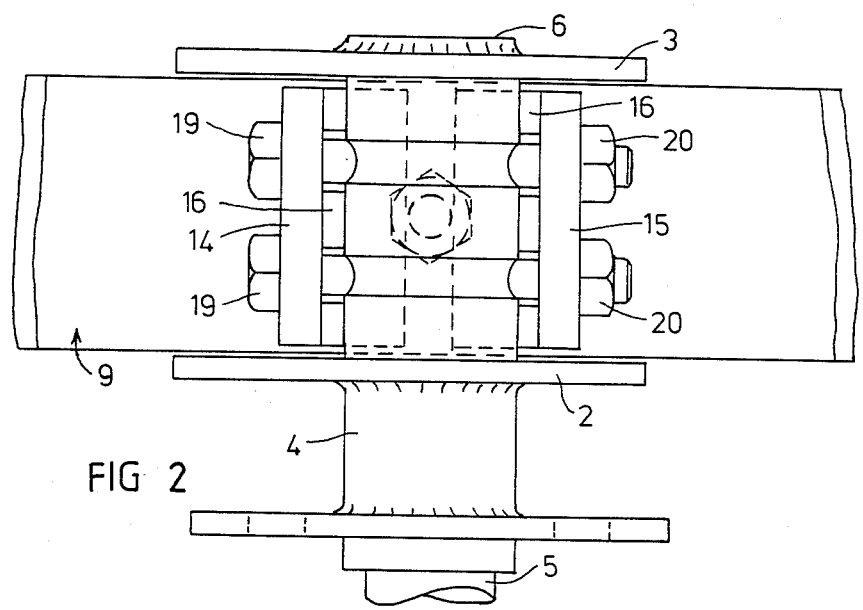
FIG. 2 is a plan view in direction II—II of FIG. 1.
Figure 3:
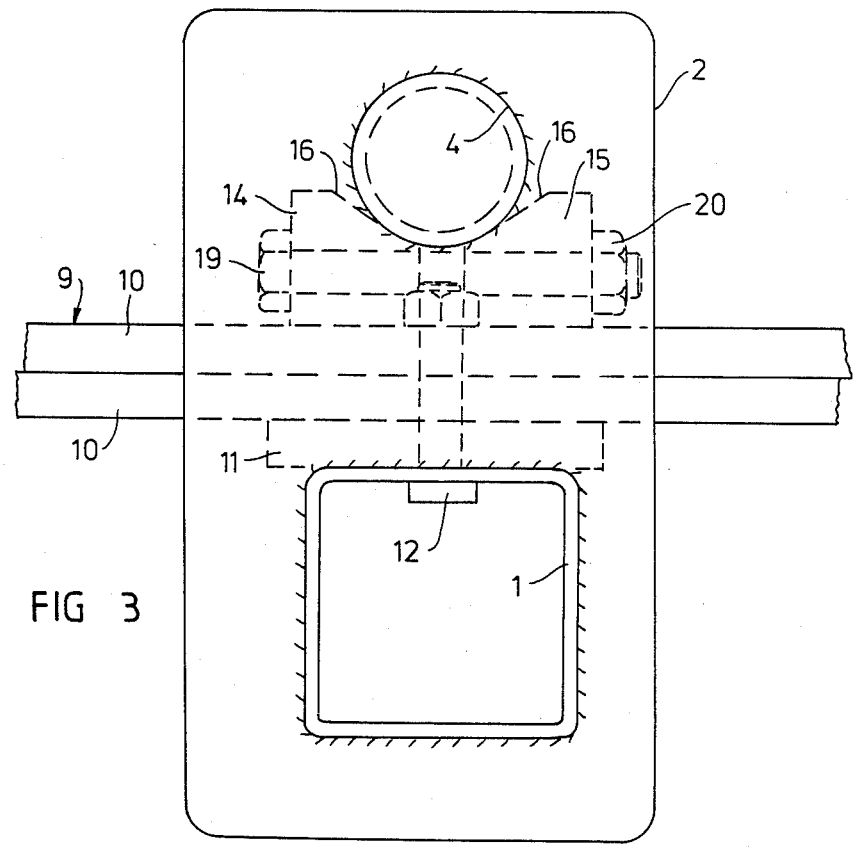
FIG. 3 is an end view in direction III—III of FIG. 1.

In its preferred form, as shown in the drawings, the present invention comprises a trailer suspension having a main or beam axle 1, typically in the form of a hollow box section as shown. At each end of the beam axle is a pair of parallel, spaced end plates 2, 3. The end plates are provided with a square hole to provide an interference fit onto the axle. The plates are forced onto the beam, using a hydraulic press and then welded to it (although only nominal welding is required).

The inner plate 3 is typically about 70 mm in from the end so that the spacing between the plates is about 65 mm. The plates extend upwardly from each end of the beam axle and at each end a stub axle 4 extends through the upper end of the plates, being welded to both plates. The free end 5 of the stub axle extends outwardly from the end plates to a position where a wheel can be mounted on it. The inner end 6 of the stub axle coincides with the inner end plate 3.

The beam axle 1 may typically be 60 or 65 mm wide and the stub axles 4 typically 40 mm in diameter. The gap between the stub axle and the main axle is typically about 50 mm. Passing through this gap is a leaf spring 9, typically comprising two or three leaves 10, with a load spreading spacer plate 11, typically about 6 mm in thickness, positioned above or below the leaf spring where it passes between the end plates 3, 4.

The leaf spring is located upon the beam axle by means of a round bolt head 12 or other stud projecting from the spring. The bolt passes through the spring leaves 10, spacer plate 11 and the head 12 through a locating hole provided in the top of the beam axle. Positioned upon the leaf spring is a pair of opposed wedges 14, 15 typically cast in malleable iron. The first wedge 14 is slightly forward and the second wedge 15 slightly rearward of the stub axle. Both wedges taper inwardly towards a point immediately beneath the axis of the stub axle. The stub axle 4 coacts with the tapered upper surfaces 16 of the wedges. The wedges are secured together by means of a bolt or preferably a pair of parallel bolts 19. As the nuts 20 on each of these bolts are tightened the wedges are urged towards each other, to become forced between the leaf spring 9 and the stub axle 4. The spring is thus firmly held in the space between the two axle components. By this means, the axle assembly is prevented from moving relatively to the leaf springs.

The stub axle is provided with a pair of grooves 21, typically about 5 mm in radius, to facilitate assembly of the bolts 19 through the wedges.

This construction provides a simple and effective means of making the most of the space between the stub axle and the beam axle. The leaf spring, by passing between the end plates connecting the stub axle to the beam axle, does not take up space between the wheels which it would otherwise do, thus allowing a wider main body to lie in the space between the stub axles.

Because the wheel centre is close to the spring centre, bending moments are lower than is usual with prior art suspension assemblies facilitating the use of lightweight materials.

Various modifications to the above can be made without departing from the scope of the present invention as claimed.

What I claim is:

1. A vehicle suspension comprising:
   (a) a beam axle;
   (b) two pair of plates one said pair being mounted on each end of the beam axle and the two plates of each pair being spaced from each other along the axis of the beam axle;
   (c) two stub axles each being offset from the beam axle and each extending between the plates of one of the said pairs of plates;
   (d) two leaf springs each extending transversely of the beam axle between the plates of one of the said pairs of plates;
   (e) two pairs of opposed wedges one pair being situated between each said leaf spring and its adjacent stub axle and positioned to form a cradle for its stub axle; and
   (f) means for drawing the wedges of each said pair of opposed wedges together to wedge the leaf spring and the stub axle apart.

2. A vehicle suspension as claimed in claim 1, wherein the said means for drawing the wedges at each end of the beam axle together comprises at least one bolt passing through the wedges and a nut, the bolt and the nut being tightenable together to draw the wedges together.

3. A vehicle suspension as claimed in claim 2, wherein the said at least one bolt is received in a circumferential groove in the stub axle at the same end of the beam axle.

4. A vehicle suspension as claimed in claim 1, wherein each said leaf spring is secured to the beam axle by a stud passing through such leaf spring and situated between the wedges of the said pair of wedges between that leaf spring and the stub axle at the same end of the beam axle.

5. A vehicle suspension as claimed in claim 4, further comprising a rigid plate between each said leaf spring and the beam axle, the studs passing through the rigid plates.

6. A vehicle suspension as claimed in claim 1 in which the inclined surface of each wedge is generally planar.

7. A vehicle suspension as claimed in claim 1 in which the length of each wedge under its associated stub axle is such as to leave a gap between the opposed wedges in a pair of wedges.

8. A vehicle suspension as claimed in claim 7 in which each wedge is of about the same length.

* * * * *